(12) United States Patent
Tsuji et al.

(10) Patent No.: US 7,429,169 B2
(45) Date of Patent: Sep. 30, 2008

(54) CLAMPING APPARATUS AND MOLDING MACHINE

(75) Inventors: Makoto Tsuji, Yamato (JP); Saburo Noda, Atsugi (JP); Toshiaki Toyoshima, Zama (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 174 days.

(21) Appl. No.: 11/419,259

(22) Filed: May 19, 2006

(65) Prior Publication Data

US 2006/0263471 A1 Nov. 23, 2006

(30) Foreign Application Priority Data

May 20, 2005 (JP) ............................. 2005-148200

(51) Int. Cl.
*B29C 45/68* (2006.01)
*B22D 17/26* (2006.01)

(52) U.S. Cl. .................. 425/190; 425/192 R; 425/589; 425/451.3; 164/312; 164/341; 164/342

(58) Field of Classification Search ................. 425/190, 425/192 R, 589, 595, 451.3; 164/312, 341, 164/342

See application file for complete search history.

(56) References Cited

U.S. PATENT DOCUMENTS

| | | | | |
|---|---|---|---|---|
| 5,542,465 A | * | 8/1996 | Wolniak | ....................... 164/341 |
| 6,120,722 A | * | 9/2000 | Schad | ......................... 425/190 |
| 7,186,106 B2 | * | 3/2007 | Kato et al. | ................... 425/190 |
| 2003/0020194 A1 | * | 1/2003 | Di Dio et al. | ............. 425/451.3 |
| 2003/0217829 A1 | * | 11/2003 | Baron et al. | ................. 164/341 |

FOREIGN PATENT DOCUMENTS

| | | | |
|---|---|---|---|
| JP | 3-215 | * | 1/1991 |
| JP | H07-030336 U | | 6/1995 |
| JP | 2004-255386 | | 9/2004 |
| JP | 2004-330552 | | 11/2004 |
| JP | 2005-118793 | * | 5/2005 |
| WO | WO 2004/041509 | * | 5/2004 |

* cited by examiner

*Primary Examiner*—James Mackey
(74) *Attorney, Agent, or Firm*—DLA Piper US LLP

(57) ABSTRACT

A clamping apparatus having a simple configuration and capable of opening and closing dies and clamping the dies, which includes a base frame; a fixed die plate; a movable die plate; a rack fixed with respect to the base frame and extending in a die opening and closing direction; a pinion pivotally supported by the movable die plate and meshing with the rack; a motor provided in the movable die plate, driving and rotating the pinion, and moving the movable die plate toward the die opening and closing direction; a tie bar having a jointed portion; a joint portion provided on the movable die plate and capable of engaging and disengaging the jointed portion of the tie bar; and a clamping cylinder provided on the fixed die plate and imparting tension to the tie bar with the joint portion and the jointed portion jointed to generate clamping force.

4 Claims, 7 Drawing Sheets

FIG. 2
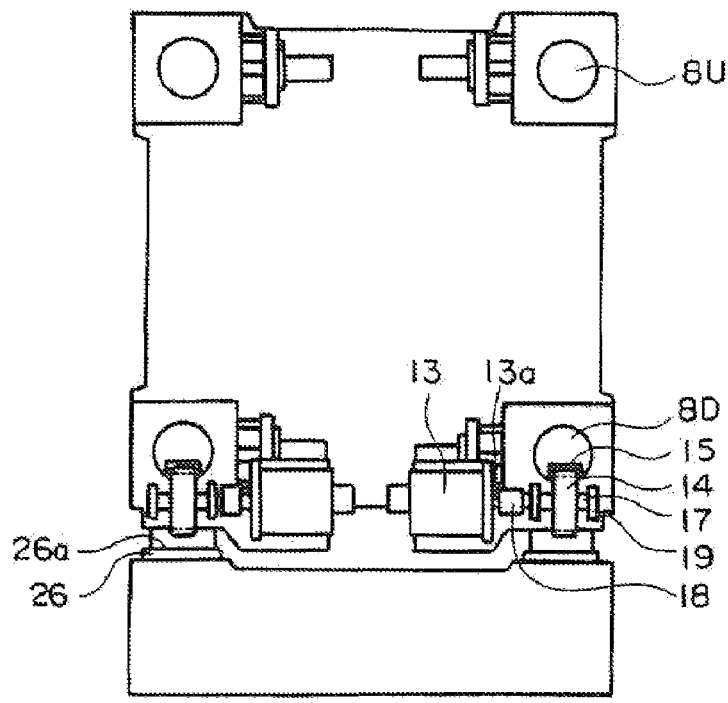
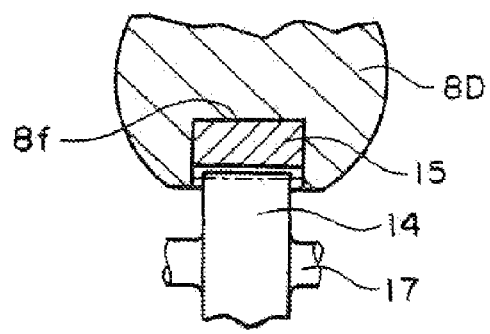
FIG. 3A
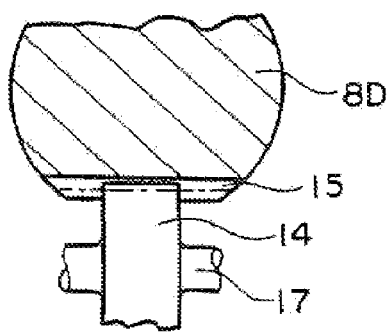
FIG. 3B

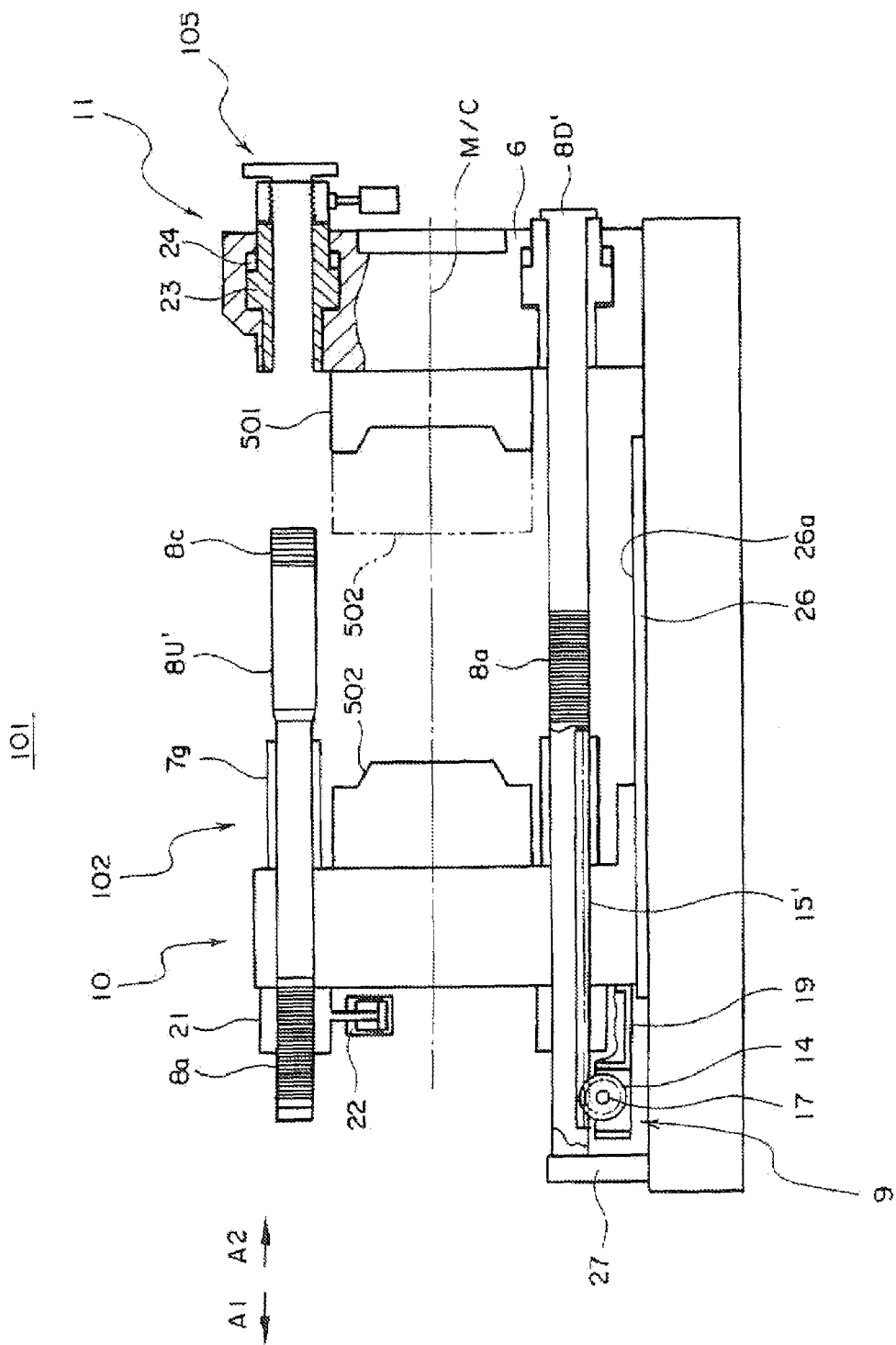

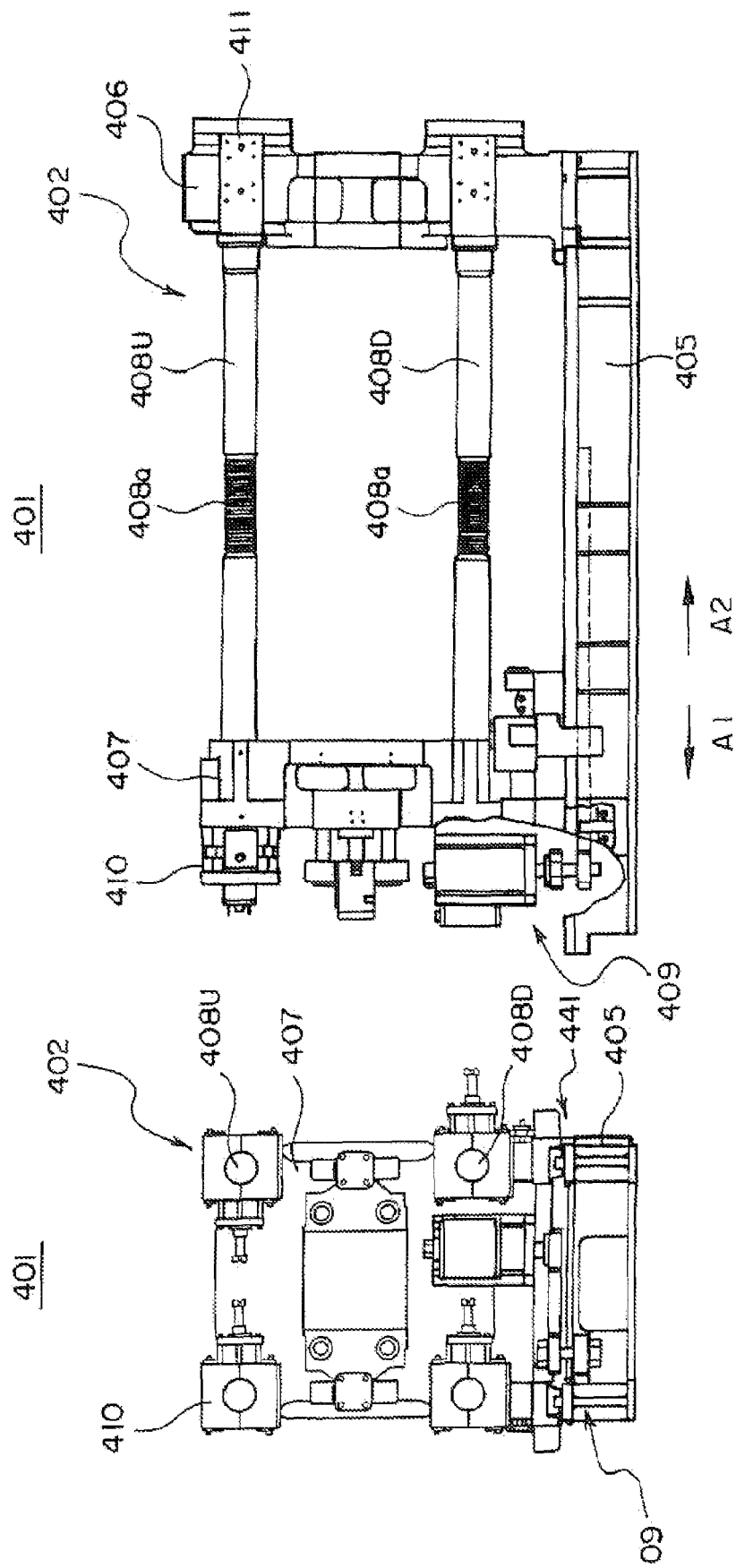

CLAMPING APPARATUS AND MOLDING MACHINE

CROSS-REFERENCE TO RELATED APPLICATION

This application claims priority to Japanese Application No. 2005-148200, filed May 20, 2005, which is herein incorporated by reference.

BACKGROUND OF THE INVENTION

1. Field of the Invention

The present invention relates to a clamping apparatus and a molding machine.

2. Description of the Art

A clamping apparatus opens and closes dies by movement of a movable die plate. The clamping apparatus imparts a clamping force to a fixed die and a movable die to clamp the dies. Various types of driving mechanisms for opening and closing the dies and for clamping the dies have been proposed.

In a clamping apparatus disclosed in Japanese Patent Publication (A) No. 2004-330552, a movable die plate is moved by screw axes in a die opening and closing direction. Ends of tie bars are fixed to pistons of clamping cylinders provided on a fixed die plate. Other ends are jointed to half nuts provided on the movable die plate. The tension is imparted to the tie bars by the clamping cylinders to generate the clamping force. There is also known a clamping apparatus used with oil pressure cylinders in place of the screw axes, disclosed in Japanese Utility Model Application No. 7-30336.

In a clamping apparatus disclosed in Japanese Patent Publication (A) No. 2004-255386, a movable die plate is movable in a die opening and closing direction by a rack provided at a base and a pinion provided at the movable die plate. A supporting plate working together with the movable die plate movable in the die opening and closing direction is provided behind the movable die plate. The supporting plate is depressed by a rod fixed to a piston of a clamping cylinder provided on the movable die plate to generate the clamping force as a result of a reaction force from the supporting plate.

The former technologies suffer from drawbacks due to the dies being opened and closed by the screw axes or the oil pressure cylinders. For example, in the screw axes, the speed of opening and closing the dies difficulty increases. In addition, in the oil pressure cylinders, since oil tanks and a lot of control valves are used, a management for preventing an oil leakage may be necessary. Therefore, a configuration and a control of the clamping apparatus can be complicated.

SUMMARY OF THE INVENTION

An aspect of an embodiment of the present invention is to provide a clamping apparatus having a simple configuration capable of opening and closing a die and clamping, the die. An aspect of an embodiment of the present invention is to provide a molding machine using the clamping apparatus.

According to an embodiment of the present invention, there is provided a clamping apparatus having a base; a fixed die plate fixed on the base and capable of holding a fixed die; a movable die plate provided movably in a die opening and closing direction on the base and capable of holding a movable die; a rack fixed with respect to the base and extending in the die opening and closing direction; a pinion pivotally supported by the movable die plate and meshing with the rack; a driving source provided on the movable die plate, and driving and rotating the pinion to move the movable die plate in the opening and closing direction; a tie bar extending in the die opening and closing direction so as to pass through the movable die plate and the fixed die plate and having a jointed portion; a joint portion provided on the movable die plate and capable of engaging and disengaging the jointed portion of the tie bar; and a clamping cylinder provided on the fixed die plate, having a piston capable of locking the tie bar and a cylinder chamber housing the piston, and capable of generating a clamping force by oil pressure, the oil pressure being fed to the cylinder chamber in a state where the joint portion and the jointed portion are jointed.

In one embodiment, the tie bar is fixed with respect to the base and the rack is provided on the tie bar.

In one embodiment, a plurality of tie bars is provided. The tie bars include a lower tie bar provided in the base side closer than the middle portion of attachment positions of the fixed die and the movable die. The rack is provided on a surface of the lower tie bar on the base side.

In one embodiment, a plurality of tie bars is provided. The tie bars include a lower tie bar provided in the base side closer than the middle portion of attachment positions of the fixed die and the movable die. An upper tie bar is provided in an opposite side of the base side closer than the middle portion of attachment positions of the fixed die and the movable die. The lower tie bar is fixed with respect to the base and the jointed portion of the lower tie bar is provided in the middle of the lower tie bar. The rack is provided on the lower tie bar so as to move the movable die plate toward a die opening direction past the jointed portion of the lower tie bar. A locked portion is provided at an end portion of the upper tie bar on the fixed die plate side. A lock portion capable of engaging and disengaging the locked portion and locked by the piston is provided on the fixed die plate. In a state where the jointed portion of the upper tie bar and the joint portion of the movable die plate are jointed and an engagement between the locked portion and the lock portion of the fixed die plate is released, the upper tie bar is capable of pulling out from the fixed die plate by moving the movable die plate toward the die opening direction past the jointed portion of the lower tie bar.

In one embodiment, a plurality of tie bars are provided. The tie bars include the lower tie bar provided in the base side closer than the middle portion of attachment positions of the fixed die and the movable die and the rack, the pinion, and the driving source are provided in the base side closer than the lower tie bar.

In one embodiment, the rack has a cog surface facing the lower tie bar toward the base side. The driving source is provided so that an output axis thereof is perpendicular to a longitudinal direction of the rack on the cog surface side of the rack. The pinion is provided on the output axis of the driving source and meshes with the rack.

In one embodiment, two slide units are provided in two sides with respect to the die opening and closing direction. The slide units support the movable die plate on the base and guide the movable die plate in the die opening and closing direction. Two racks and two pinions are provided so as to adjoin the two slide units. The driving source is provided in the middle portion of the two slide units.

In one embodiment, the rack is provided near one side with respect to the die opening and closing direction and the driving source is provided near another side with respect to the die opening and closing direction.

According to an embodiment of the present invention, there is provided a molding machine having a base; a fixed die plate fixed on the base and capable of holding a fixed die; a movable die plate provided movably in a die opening and closing direction on the base and capable of holding a movable die; a rack fixed with respect to the base and extending in the die opening and closing direction; a pinion pivotally supported by the movable die plate and mashing with the rack; a driving source provided on the movable die plate, and driving and rotating the pinion to move the movable die plate in the die opening and closing direction; a tie bar extending in the die opening and closing direction so as to pass through the movable die plate and the fixed die plate and having a jointed portion; a joint portion provided on the movable die plate and capable of engaging and disengaging the jointed portion of the tie bar; a clamping cylinder provided on the fixed die plate, having a piston capable of locking the jointed portion of the tie bar and a cylinder chamber housing the piston, and capable of generating clamping force by oil pressure which is fed to the cylinder chamber in a state where the joint portion and the jointed portion are jointed; an injection sleeve communicating with a cavity defined by the fixed die and the movable die; a plunger chip slidingly moved in the injection sleeve to inject a molding material into the cavity; and an injection cylinder driving the plunger chip.

According to an embodiment of the present invention, the die opening and closing and the die clamping can be performed with the simple configuration.

BRIEF DESCRIPTION OF THE DRAWINGS

FIG. 2 is a view illustrating the molding machine of FIG. 1 seen from a movable die plate side;

FIGS. 3A and 3B are views each enlarged with a rack and a pinion of the molding machine of FIG. 1;

FIG. 4 is a side view illustrating a molding machine, according to a second embodiment of the present invention;

FIGS. 8A and 8B are views illustrating a molding machine, according to a fifth embodiment of the present embodiment.

DESCRIPTION OF SEVERAL EMBODIMENTS
OF THE INVENTION

First Embodiment

Figure 1:
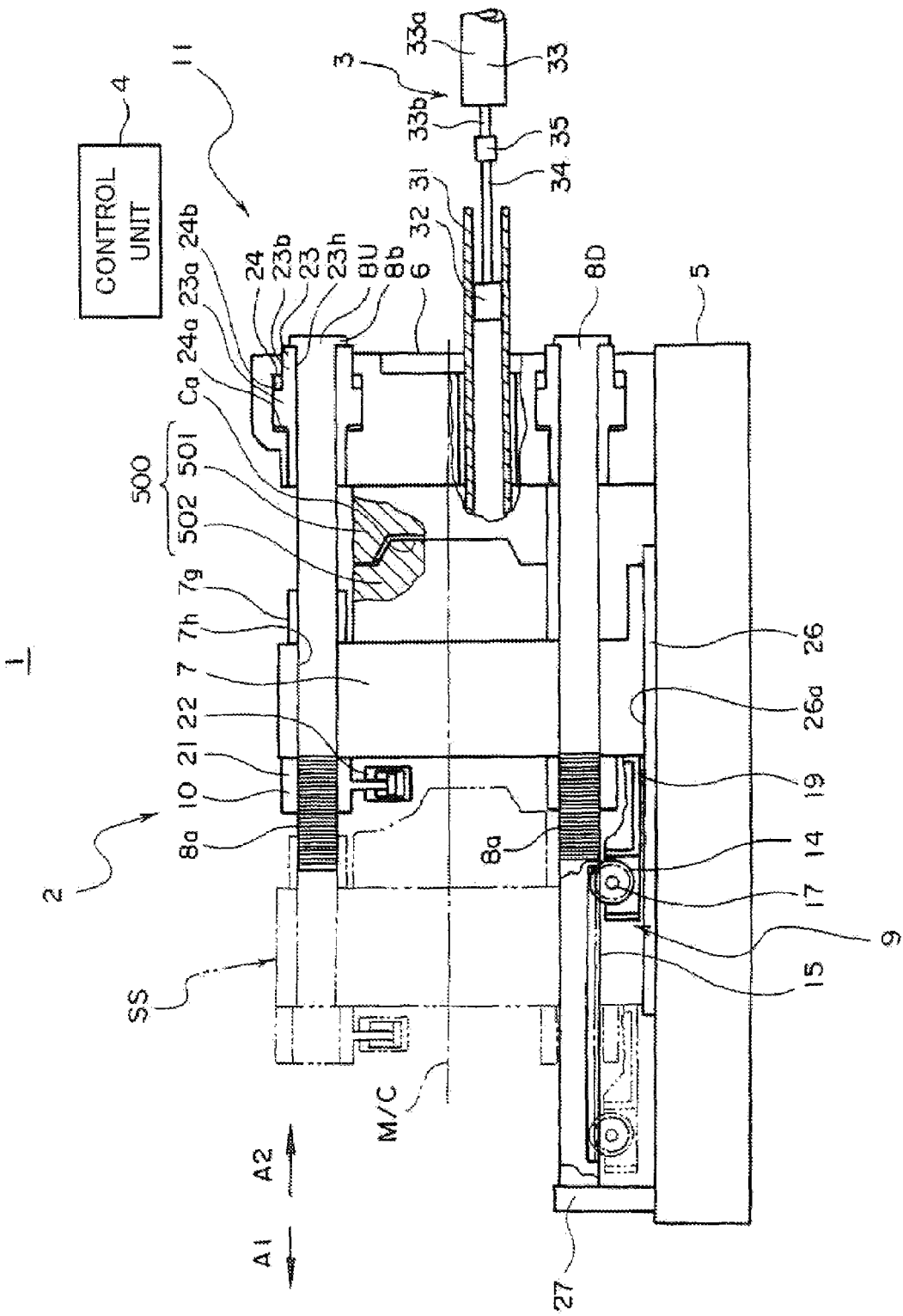
FIG. 1 is a side view illustrating a molding machine, according to a first embodiment of the present invention.

FIG. 1 is a side view illustrating a die cast machine 1 with broken away parts according to a first embodiment of the present invention. FIG. 2 is a front view illustrating the die cast machine 1 seen from a movable die plate side (left side of the drawing in FIG. 1). Note that, in FIG. 1, a solid line indicates a state where a die closing is finished and a two-dot broken line indicates a state where a die opening is finished. A center line M/C expressed by a one-dot broken line is a line passing through a center of position provided with a die 500.

The die cast machine 1 is provided with a clamping apparatus 2 for opening and closing the die 500 and clamping the same. The die cast machine 1 includes an injection apparatus 3 for injecting a molten metal to fill a cavity Ca of the die 500 held by the clamping apparatus 2. The die cast machine 1 also includes a control unit 4 for controlling operations of the clamping apparatus 2 and the injection apparatus 3.

The clamping apparatus 2 is provided with a base frame 5, a fixed die plate 6 and a movable die plate 7 facing each other on the base frame 5. The clamping apparatus 2 is also provided with plurality of tie bars 8U and 8D (hereinafter, also referred to simply as tie bars 8) set between the movable die plate 6 and the fixed die plate 7. The clamping apparatus 2 is further provided with drive mechanisms 9 for moving the movable die plate 7 in a die opening and closing direction, joint portions 10 for jointing the movable die plate 7 and the die bars 8, and clamping cylinders 11 for generating a clamping force.

The fixed die plate 6 is fixed on the base frame 5. A T-shaped groove (not shown) to which a bolt head is insertable and lockable is for example provided on a surface of the fixed die plate 6 facing the movable die plate 7, thereby holding the fixed die 501.

The movable die plate 7 is movable in a die opening direction A1 and a die closing direction A2 on the base frame 5. For example, a slide plate 26 extending in the die opening and closing direction and having a flatten surface to be mounted 26a is provided on the base frame 5. The movable die plate 7 is mounted on the surface 26a, so that the movable die plate 7 is slidingly movable in the die opening and closing direction with respect to the base frame 5. A surface of the movable die plate 7 facing the fixed die plate 6 can hold the movable die 502 in the same way as the fixed die plate 6. Through holes 7h for inserting the tie bars 8 are opened at corner portions of the movable die plate 7. Tie bar guides 7g connected to the through holes 7h and defining through holes are provided so as to project out of a fixed die plate 6 side. The tie bar guides 7g are, for example, respectively formed in a cylindrical shape.

Note that the fixed die 501 held by the fixed die plate 6 and the movable die 502 held by the movable die plate 7 are closed, thereby defining the cavity Ca with a space between the fixed die 501 and the movable die 502. In FIG. 1, the fixed die 501 and the movable die 502 are attached in the approximately middle portion of the fixed die plate 6 and the movable die plate 7.

For example, four tie bars are provided so as to pass through the corner portions of the fixed die plate 6 and the movable die plate 7. Namely, two lower tie bars 8D are provided closer to the base frame 5 side nearer than the center line M/C. Two upper tie bars 8U are provided in an opposite side of the base frame 5 side, relative to the center line M/C.

The tie bars 8U are engaged and fixed, i.e., locked, by the clamping cylinders 11 at their ends on the fixed die plate 6 side to restrict the movement of the tie bars 8U toward the die opening direction A1 with respect to the fixed die plate 6. The tie bars 8U are provided with jointed portions 8a for jointing the movable die plate 7. Each of the jointed portions 8a is, for example, a jointed groove formed by a groove spirally extending in a circumference of each tie bar 8U or a jointed groove formed by a plurality of grooves extending in the circumference of each tie bar 8U and disposed in a longitudinal direction of each tie bar 8U.

The tie bars 8D are also locked by the clamping cylinders 11 at one end on the fixed die plate 6 side to restrict their movement toward the die opening direction A1 with respect to the fixed die plate 6. The tie bars 8D are fixed to tie bar supporting plate 27. The tie bar supporting plate is provided in the base frame 5, at another end of the movable die plate 7 side to restrict the movement of the movable die plate 7 toward the die closing direction A2 with respect to the base frame 5. In the middle of the tie bars 8D, jointed portions 8a for jointing the movable die plate 7 are provided. A configuration of the jointed portions 8a is, similar to joining portions 8a in the tie bars 8U, for example a jointed groove.

A length of the tie bars 8U from one end of the fixed die plate 6 side to the jointed portions 8a is the same as that of the tie bars 8D from one end of the fixed tie plate 6 side to the jointed portions 8a. Therefore, the tie bars 8D are longer than the tie bars 8U by a length from the jointed portion 8a to another end of the movable die plate 7 side.

Each of the drive mechanisms 9 is provided with a motor 13 (referring to FIG. 2), a pinion 14 rotated by driving force of the motor 13, and a rack 15 meshing with the pinion 14.

The motor 13, as shown in FIG. 2, is provided for example at an end portion of the movable die plate 7 on the base frame 5 side and between the lower tie bars 8D. An output axis 13a of the motor 13 is provided so as to be perpendicular to the die opening and closing direction and parallel to the surface to be mounted 26a of the base frame 5. The motor 13 can be for example an AC servo motor, and an operation thereof is controlled by the control unit 4.

The pinion 14 is rotatably held to the movable die plate 7 by the rotation axis 17 passing through and fixed in the middle portion and pivotally supported to a bearing portion 19 provided on the movable die plate 7. The rotation axis 17 is connected to the output axis 13a of the motor 13 through a coupling 18 and transmits to the pinion 14 a rotation of the output axis 13a of the motor 13.

The pinion 14, as shown in FIG. 1, is provided in the movable die plate 7 on an opposite side of a side facing the fixed die plate 6. Namely the bearing portion 19 is mounted so as to project out toward the die opening direction A1. The bearing portion 19 for example is constructed longer than the jointed portion 8a in the die opening and closing direction Therefore, so the pinion 14 is positioned on the die opening direction A1 side past the jointed portion 8a when the joint portion 10 and the jointed portion 8a are jointed at the end portion of the jointed portion 8a on the die closing direction A2 side.

The rack 15 is attached to the lower tie bar 8D so as to extend in the longitudinal direction of the lower tie bar 8D. Namely, the lower tie bar 8D extends in the die opening and closing direction. Specifically, the rack 15 extends from a position adjoining the jointed portion 8a to a position adjoining the tie bar supporting plate 27. Furthermore, the rack 15 is attached to a surface of the lower tie bar 8D on the base frame 5 side so as to face a cog surface thereof to the base frame 5 side.

Note that the drive mechanisms 9, as shown in FIG. 2, are provided correspondingly to the two lower tie bars 8D. The sets of motors 13, the pinion 14, and the rack 15 are symmetrically mounted by applying a center line between the two lower tie bars 8D as a symmetrical axis. Note that the sets may be mounted asymmetrically..

Four joint portions 10 are provided on a surface of the movable die plate 7 on an opposite side of a side facing the fixed die plate 6 so as to correspond to the four tie bars 8. The four joint portions 10 are provided with half nuts 21 and joint cylinders 22 driving the half nuts 21, for example. Note that, FIG. 1 is illustrated with the joint cylinders 22 of the joint portions 10 on the tie bar 8U and on the lower tie bar 8D side the joint cylinders 22 are omitted.

The half nuts 21 are opened and closed by the joint cylinders 22. When the half nuts 21 are closed and mesh with (connect) the jointed portions 8a of the tie bars 8, the tie bars 8 and the movable die plate 7 are jointed. When the half nuts are opened, the joint between the tie bars 8 and the movable die plate 7 is released.

Four clamping cylinders 11 are provided corresponding to the four tie bars 8. Every cylinder 11 has an annular piston 23 supporting each of the tie bars 8 and a cylinder chamber 24 holding at least part of the annular piston 23.

The annular piston 23 has a piston portion 23a slidably movable in the cylinder chamber 24 and a rod portion 23b having a diameter smaller than the piston portion 23a.

The piston portion 23a has an annular shape. The piston portion 23a divides the cylinder chamber 24 into a first cylinder chamber 24a and a second cylinder chamber 24b. The piston portion 23a is biased in a longitudinal direction of the tie bar 8 by a pressure difference between the first cylinder chamber 24a and the second cylinder chamber 24b.

The rod portion 23b extends along the longitudinal direction of the tie bar 8 so as to project out from the piston portion 23a toward the movable die plate 7 side, and the opposite side thereof. The piston portion 23a and the rod portion 23b are provided with a through hole 23h for inserting each of the tie bars 8. Each of the tie bars 8 is slidingly contacted to the through hole 23h. A locked portion 8b is provided at an end of each of the tie bars 8 on the fixed die plate 6 side. The locked portion 8b is locked by the rod portion 23b to restrict a movement of each of the tie bars 8 toward the die opening direction A1. The locked portion 8b, for example, is formed by the edge portion of each of the tie bars 8 which has a larger diameter.

The first cylinder chamber 24a and the second cylinder chamber 24b are provided with openings (not shown) for feeding or draining a hydraulic fluid, e.g., pressure and oil, valves (not shown) for controlling a flow rate of the pressure oil to the openings. The control unit 4 controls the valves to feed the pressure oil to the first cylinder chamber 24a and the second cylinder chamber 24b.

The injection apparatus 3 is provided with an injection sleeve 31 communicating with the cavity Ca, a plunger chip 32 slidingly movable in the injection sleeve 31, and an injection cylinder 33 driving the plunger chip 32.

The injection sleeve 31, for example, is formed in an approximately cylindrical shape. The injection sleeve 31 is inserted from the fixed die plate 6 on an opposite side of a surface facing the movable die plate 7 into a hole provided in the fixed die plate 6 and the fixed die 501 to communicate with the cavity Ca. The injection sleeve 31 is provided with a feed port (not shown) for feeding a molten metal into the injection sleeve 31.

The plunger chip 32 is plugged into the injection sleeve 31 and slidingly moved in the injection sleeve 31 to eject the molten metal from the injection sleeve 31 to inject the molten metal into cavity Ca to thereby fill the cavity Ca.

The injection cylinder 33 has a rod 33b fixed to a piston (not shown) slidingly moving in the cylinder 33a. The rod 33 is connected through a coupling 35 with a plunger chip 34 fixed to the plunger chip 32. The injection cylinder 33, for example, is filled by the oil pressure, and an operation thereof is controlled by the control unit 4.

FIGS. 3A and 3B are views each illustrating the pinion 14 and the rack 15 seen from the movable die plate 7 side (left side of the drawing in FIG. 1). FIGS. 3A and 3B illustrate methods for forming the rack 15 at the lower tie bar 8D.

In FIG. 3A, a recess portion 8f extending along a longitudinal direction (a backward direction of the drawing) of the tie bar 8D is provided in a surface of the tie bar 8D on the base frame 5 side. The rack 15 is inserted into the recess portion 8f, in this way, the rack 15 is disposed in the lower tie bar 8D. The recess portion 8f is formed in a rectangular section for example by cutting. The rack 15 is fixed to the lower tie bar 8D for example by a bolt.

In FIG. 3B, the rack 15 is constructed by directly forming a cog in a surface of the tie bar 8D on the base frame 5 side. The cog, for example, can be formed by cutting.

Note that, in FIG. 3A and FIG. 3B, a cog edge of the rack 15 is housed inside a circumference of the tie bar 8D. Therefore, the tie bar 8D is not prevented from passing through the fixed die plate 6 and the movable die plate 7. In the die cast machine 1, the rack 15 may be constructed in the lower tie bar 8D by either way of FIG. 3A and FIG. 3B.

An operation of the die cast machine 1 having the above configuration will be described.

As indicated by the two-dot broken line in FIG. 1, at a start of a molding cycle, the movable die plate 7 is placed at a position SS moved toward the die opening direction A1 side past the jointed portions 8a. At this time, the pinions 14 are positioned at the end portions of the racks 15 on the die opening direction A1 side. Furthermore, the ends of the tie bars 8U on the movable die plate 7 side are supported by the tie bar guides 7g.

From the above state, the pinions 14 are driven and rotated by the motors 13. As a result, the movable die plate 7 is moved toward the die closing direction A2. At this stage, the control unit 4 controls the motors 13 so that the movable die plate 7 is moved at relatively high speed at the starting of the movement, and decelerated when the movable die plate 7 reaches a predetermined position to be moved at relatively low speed. Note that the speed may be changed stepwise based on a distance between the fixed die 501 and the movable die 502 or reduced continuously and gradually.

As indicated by the solid line in FIG. 1, the joining of the fixed die 501 and the movable die 502 results in a completion of the die clamping. Since positions of the pinions 14 at this time is determined based on a die thickness of the die 500, from a view point of reducing the whole length of the clamping apparatus 2, it is desired that positions of the racks 15 on the fixed die plate 6 side are determined correspondingly to the die thickness of a die to be used in the die cast machine 1 so that the pinions 14 may be roughly positioned at the end portions of the racks 15 on the fixed die plate 6 side.

In above state, positions of the annual pistons 23 in the cylinder chambers 24 are adjusted by, for example, feeding the pressure oil to the first cylinder chambers 24a to bring the half nuts 21 and the die bars 8 in a meshable state. Note that the amount of movement of the annual pistons 23 in this case is, for example, calculated based on a value detected by a linear scale or other detectors with a relative position between the tie bars 8 and the half nuts 21.

Then, the half nuts 21 are closed to mesh with the jointed portions 8a of the tie bars 8. As a result, each tie bar 8 and the movable die plate 7 are jointed.

Then, the pressure oil is fed to the first cylinder chambers 24a to clamp the dies Therefore, tension is imparted to the tie bars 8 to generate the clamping force corresponding to the elongated amount.

In the above state, the molten metal is ejected from the injection sleeve 31 and injected into the cavity Ca to fill the cavity Ca. The molten metal is solidified in the cavity to form a die casting. Then the feed of the pressure oil to the first cylinder chambers 24a is terminated and the pressure oil is fed to the second cylinder chambers 24b, thereby performing an initial operation for opening the dies. Note that in this case, the motors 13 are configured in a torque free state. The dies are opened in a predetermined amount, then the feed of the pressure oil to the second cylinder chambers 24b is terminated. The half nuts 21 are opened to release joints between the half nuts 21 and the jointed portions 8a.

Then, the pinions 14 are driven and rotated by the motors 13. As a result, the movable die plate 7 is moved toward the die opening direction A1. At this time, the control unit 4 controls the motors 13 so that the movable die plate 7 is moved at a relative high speed at the start of the movement, and decelerated to be moved at a relatively slow peed when the movable die plate reaches a predetermined position and moved at the relative slow speed. Note that the speed may be changed stepwise based on the distance between the fixed die 501 and the movable die 502 or reduced continuously and gradually.

After moving the die plate 7, the movable die plate 7 reaches the same position SS the same as the cycle start position. A molded product is taken out and a release agent is coated to the fixed die 501 and the movable die 502 or other treatment is performed. As a result, the molding cycle is finished.

According to the above embodiment, since the dies are opened and closed by the pinions 14 and the racks 15, various types of merits are obtained in comparison with the die opening and closing by the screw axes or the oil pressure pistons. For example, the whole system can be rendered less expensive. In addition, an attachment space for a drive apparatus can be reduced. Also, the movement becomes smooth and the speed of operation can increase, in addition to ease of control at various speeds. Furthermore, the maintenance of the system becomes easy, and a tolerance of environment becomes superior. Furthermore, since the tension is imparted to the tie bars 8 by the clamping cylinders 11 provided on the fixed die plate 6 to generate the clamping force, the supporting plate may be unnecessary to be provided on the base frame 5 other than the fixed die plate 6 and the movable die plate 7. Therefore, the configuration becomes simple.

The lower tie bars 8D are fixed to the base frame 5 and the racks 15 are provided on the lower tie bars 8D to implement the movement of the movable die plate 7. Hence, a member for attaching the racks 15 may be unnecessary.

Furthermore, the racks 15 are attached to the lower tie bars 8D on the base frame 5 side. Hence, the pinions 14, for example, are provided in the base frame 5 side closer to the lower tie bars 8D. Namely, the pinions 14 for example are provided outside the space provided with the movable die 502. For example, a working space for attaching the movable die 502 or other working space may be easily secured and a die to be subjected may easily increase. The racks 15 are provided from a position adjoining the ends of the lower tie bars 8D on the tie bar supporting plate 27 side to a position adjoining the jointed portions 8a. Hence, the lower tie bars 8D can be shortened and the whole length of the clamping apparatus 2 can also be shortened.

Second Embodiment

FIG. 4 is a side view illustrating a die cast machine 101 according to a second embodiment of the present invention. Note that components the same as those of the first embodiment are assigned the same notations and explanations thereof are omitted. Furthermore, the die cast machine 101 of the second embodiment, in the same way as the first embodiment, is also provided with the injection apparatus 3 and the control unit 4, which are omitted in FIG. 4. Note that, in FIG. 4, a solid line indicates a state where tie bars 8U' are pulled out from the fixed die plate 6 and a two-dot line indicates a position of the movable die 502 after clamping the dies.

In the clamping apparatus 102 of the die cast machine 101, the configuration on a lower side (the base frame 5 side) is the same configuration as the clamping apparatus 2 of the first embodiment, while a configuration on an upper side than the center line M/C differs from the configuration of the clamping apparatus 2 of the first embodiment in a shape of the upper tie bars 8U' on the fixed die plate 6 side, for example.

At the end portions of the upper tie bars 8U' on the fixed die plate 6 side, locked portions 8c are provided in place of the locked portions 8b of the first embodiment. Each of the locked portions 8c, for example, is a jointed groove formed by a groove spirally extending in the circumference of each tie bars 8U' or a jointed groove formed by a plurality of grooves extending in the circumference of each tie bars 8U' and disposed in a longitudinal direction of the tie bars 8U'.

At positions of the fixed die plate 6 for inserting the upper tie bars 8U', lock portions 105 capable of engaging and disengaging the locked portions 8c, locked by the annual pistons 23, are provided.

Figure 5:
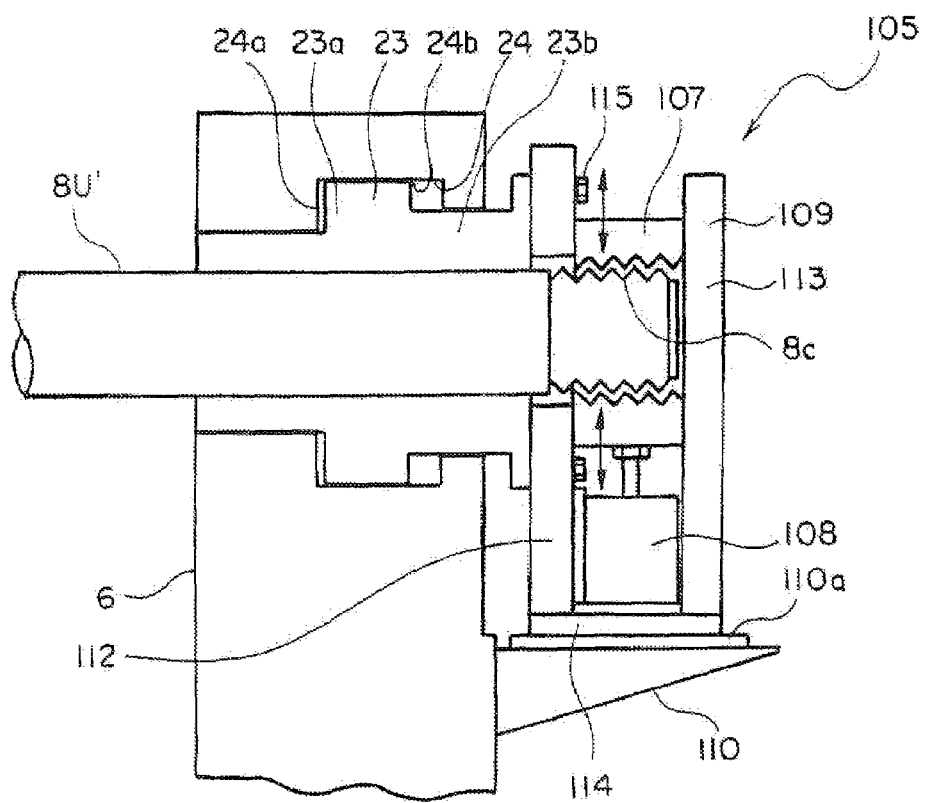
FIG. 5 is a view illustrating a lock portion of a clamping apparatus of the molding machine of FIG. 4.

FIG. 5 is an enlarged view of the locked portion 8c and the lock portion 105.

The lock portion 105 is provided with half nuts 107 capable of engaging and disengaging the locked portion 8c, a locking cylinder 108 driving the half nuts 107, a locking member 109 locking the half nuts 107 with respect to the annual piston 23, and a rest for supporting the lock member 109.

The half nut 107 has a joint groove meshing with the locked portion 8c. The half nut 107 is configured and arranged so as to be advanced and decreased toward a center axis of the tie bar 8U'. The lock cylinder 108 includes for example an oil pressure cylinder and drives the half nuts 107 by rod connected to the piston.

The lock member 109 is provided with a plate 112 touching the annual piston 23, a plate 113 disposed facing the plate 112 via the half nuts 107, and a plate 114 fixing the plate 112 and the plate 113.

The plate 112 is provided perpendicular to the tie bar 8U' in the annual pistons 23 at an opposite side (right side in the drawing) of the movable die plate 7. The plate 112 is fixed by a conclusion unit such as a screw 115 with respect to an end surface of the rod portion 23b of the annual piston 23. Note that the rod portion 23b increases in diameter on the plate 112 side to enlarge an area to be touched with the rod portion 23b and the plate 112.

The plate 113 is disposed facing to the plate 112 on a right side of the half nuts 107 in the drawing. The half nuts 107 are held by the plates 112 and 113 slidably mounted in a diameter direction of the tie bar 8U'. Note that the plate 113 also functions as a stopper member restricting a movement of the tie bar 8U' toward the right side in the drawing.

The plate 114 is provided perpendicular to the plate 112 and the plate 113. The plate 114 and is fixed to the plate 112 and the plate 113 by welding or conclusion, thereby fixing the plate 112 and the plate 113 to each other. The plate 114 supports the plate 112 and the plate 113.

The rest 110 is fixed by welding or conclusion to a surface of the fixed die plate 6 on the right side in the drawing. A surface to be mounted 110a of the rest 110 is flatly formed and supports the plate 114 to be slidably movable in the longitudinal direction of the tie bar 8U'. Note that the rest 110 may be omitted.

With the lock portion 105 and the locked portion 8c jointed, when the pressure oil is fed to the first cylinder chamber 24a, the oil pressure to the piston portion 23a is transmitted through the plate 112 and the half nuts 107 to impart tension to the tie bar 8U'. When the pressure oil is fed to the second cylinder chamber 24b, the oil pressure to the piston portion 23a is transmitted through the plate 112, the plate 114, the plate 113, and the half nut 107 to bias the tie bar 8U' toward the left side in the drawing.

The operation of the die cast machine 101 of the second embodiment, during the molding cycle, is the same as the die cast machine 1 of the first embodiment. In this case, the locked portions 8b of the upper tie bars 8U' and the lock portions 105 are jointed, and the upper tie bars 8U' are fixed to the fixed die plate 6.

In the die cast machine 101 of the second embodiment, during servicing, for example, during replacing the dies, as shown in FIG. 4, the upper tie bars 8U' are pulled out from the fixed die plate 6. Specifically, in the state where the locked portions 8a of the upper tie bars 8U' and the lock portions 10 of the movable die plate 7 are jointed and the locks between the locked portions 8c of the upper tie bars 8U' and the lock portions 105 provided in the fixed die plate 6 are released. The movable die plate 7 is moved toward the die opening direction A1 past the locked portions 8a of the lower tie bars 8D. As a result, the upper tie bars 8U' are pulled out from the fixed die plate 6.

Note that in the second embodiment, the movable die plate 7 is moved from the cycle start position SS (referred to in FIG. 1) toward the die opening direction A1 to thereby pull out the tie bars 8U'. Hence, a length of the lower tie bars 8U' and a length of the racks 15' are longer than those of the lower tie bars 8U and the racks 15 of the first embodiment by the amount of movement necessary for pulling out the upper tie bars.

According to the above second embodiment, the same effects as the first embodiment can be obtained. Furthermore, the upper tie bars 8U' can be pulled out and the work for replacing the dies is rendered easy.

Third Embodiment

Figure 6:
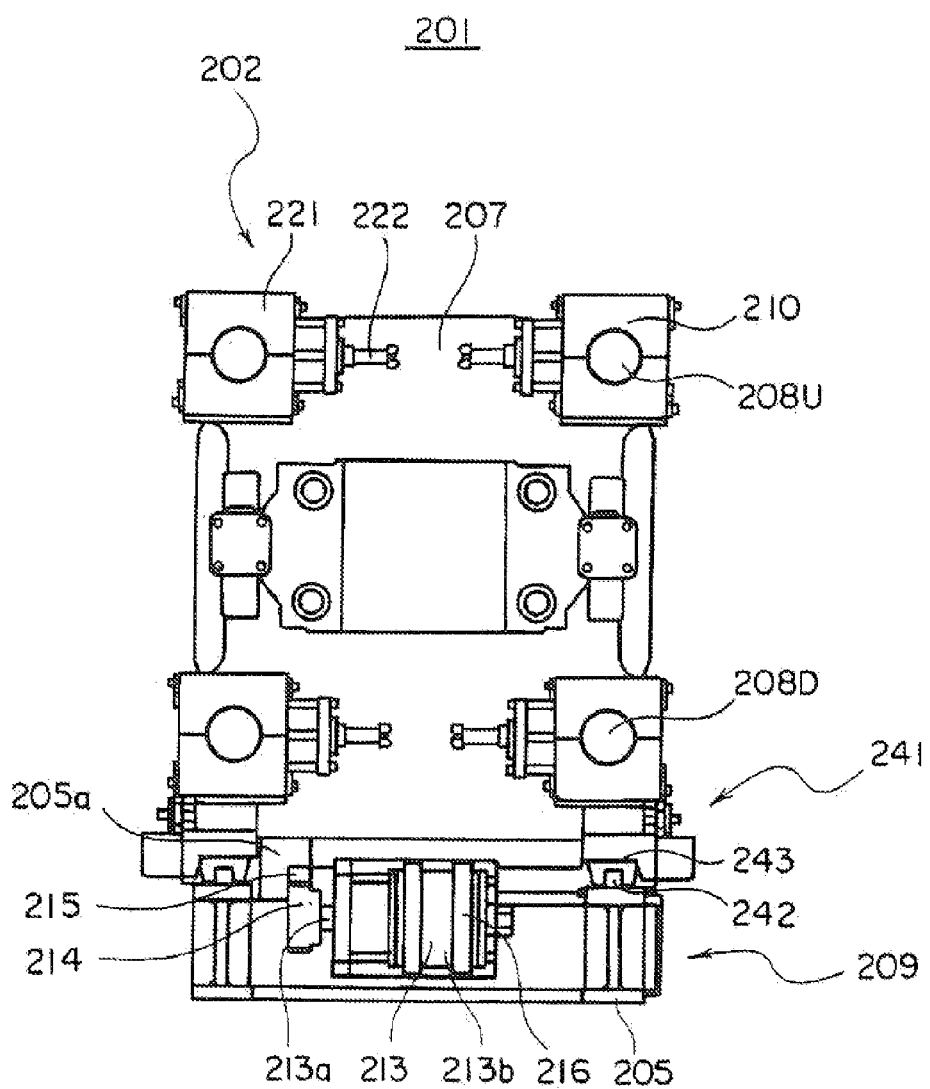
FIG. 6 is a view illustrating a molding machine seen from the movable die plate side, according to a third embodiment of the present invention.

FIG. 6 is a view of the die cast machine 201 seen from the movable die plate side according to a third embodiment of the present invention. Note that the die cast machine 201 of the third embodiment, in the same way as the die cast machine 1 of the first embodiment, is provided with the injection apparatus 3 and the control unit 4, which are omitted in FIG. 6.

The clamping apparatus 202 of the die cast machine 201 is provided with a base frame 205, a fixed die plate (not shown), a movable die plate 207, tie bars 208 set to the fixed die plate and the movable die plate 207, a drive apparatus 209 moving the movable die plate 207 in the die opening and closing direction, joint portions 210 for jointing the movable die plate 207 and the tie bars 208, and not shown clamping cylinders (not shown) generating the clamping force.

Between the movable die plate 207 and the base frame 205, slide units 241 for guiding the movable die plate 207 in the die opening and closing direction are provided. Two slide units 241 are provided at two sides with respect to the die opening and closing direction (at two end portions of the movable die plate 207 in a horizontal direction of the drawing).

The slide units 241 are provided with, for example, rails 242 and slide plates 243 which are guided by the rails 242. The rails 242 are provided on the base frame 205, project out toward the movable die plate 207 side, and extend in the die opening and closing direction. The slide plates 243 have recess portions fitting into the rails 242 and are slidingly mounted on the base frame 205 along the rails 242. On the slide plates 243, the movable die plate 207 is mounted. Therefore, the movable die plate 207 is movable along the rails 242 in the die opening and closing direction.

The drive apparatus 209 is provided with a motor 213, a pinion 214 rotated by the driving force of the motor 213, and a rack 215 meshing with the pinion 214.

The motor 213 is provided on the movable die plate 207. For example, the motor 213 is held by a holding member 216 fixed to the movable die plate 207. An output axis 213a of the motor 213 is perpendicular to the die opening and closing direction and parallel to the base frame. The motor 213 is provided so that a motor body 213b having for example a rotor is positioned in an approximately middle portion of the two slide units 241, and also provided lower than the slide units 241.

The pinion 214 is directly attached to the output axis 213a of the motor 213. Namely, the drive apparatus 209 transmits the driving force of the motor 213 by a so-called direct drive system driving mechanism.

The rack 215 is provided on a rack attachment portion 205a provided in the base frame 205. A cog surface thereof is provided toward a downward direction (a direction from the movable die plate 207 toward the base frame 205). The rack attachment portion 205a is provided lower then the lower tie bars 208D, so as to adjoin an inner side of one of the slide units 241 (the movable die plate 207 on a middle portion side). Note that, the rack 215 is provided at one of the slide units 241.

The joint portions 210 have the same configuration as the joint portions 21 of the first embodiment. Joint cylinders 222 driving the half nuts 221 are provided inside the movable die plate with respect to the half nuts 221.

According to the third embodiment, the same effect as the first embodiment can be obtained. Furthermore, the rack 215, the pinion 214, and the motor 213 are provided in the base frame 205 side closer to the base frame 205 than the lower tie bars 208D. Specifically, the rack 215, the pinion 214, and the motor 213 are provided lower than the movable die plate 207, namely, within the base frame 205. Therefore, attachment places for parts of the clamping apparatus 202 can be easily secured. For example, the joint cylinders 222 can be easily provided inside the movable die plate with respect to the half nuts 221.

Furthermore, the driving force is transmitted by the direct drive system, so attachment places for parts can be further easily secured and the driving force of the motor can be transmitted substantially without loss.

Note that, in the present embodiment, since the movable die plate 207 is guided by the rails 242, the tie bars 208 may not be needed to guide the movable die plate 207 in opening and closing the dies. The tie bars 208 can be utilized only for clamping the dies. The tie bars 208 may be configured so as to be incapable of pulling out, similar to the first embodiment or to be capable of pulling out such as the upper tie bars 8U' of the second embodiment. When the tie bars are configured to pull out, the movable die plate 207 is guided by the rails 242. Hence, both of the upper tie bars 208U and the lower tie bars 208D can be configured so as to be able to pull out. Lengths of the upper tie bars 208U and the lower tie bars 208D may be the same or different.

Forth Embodiment

Figure 7:
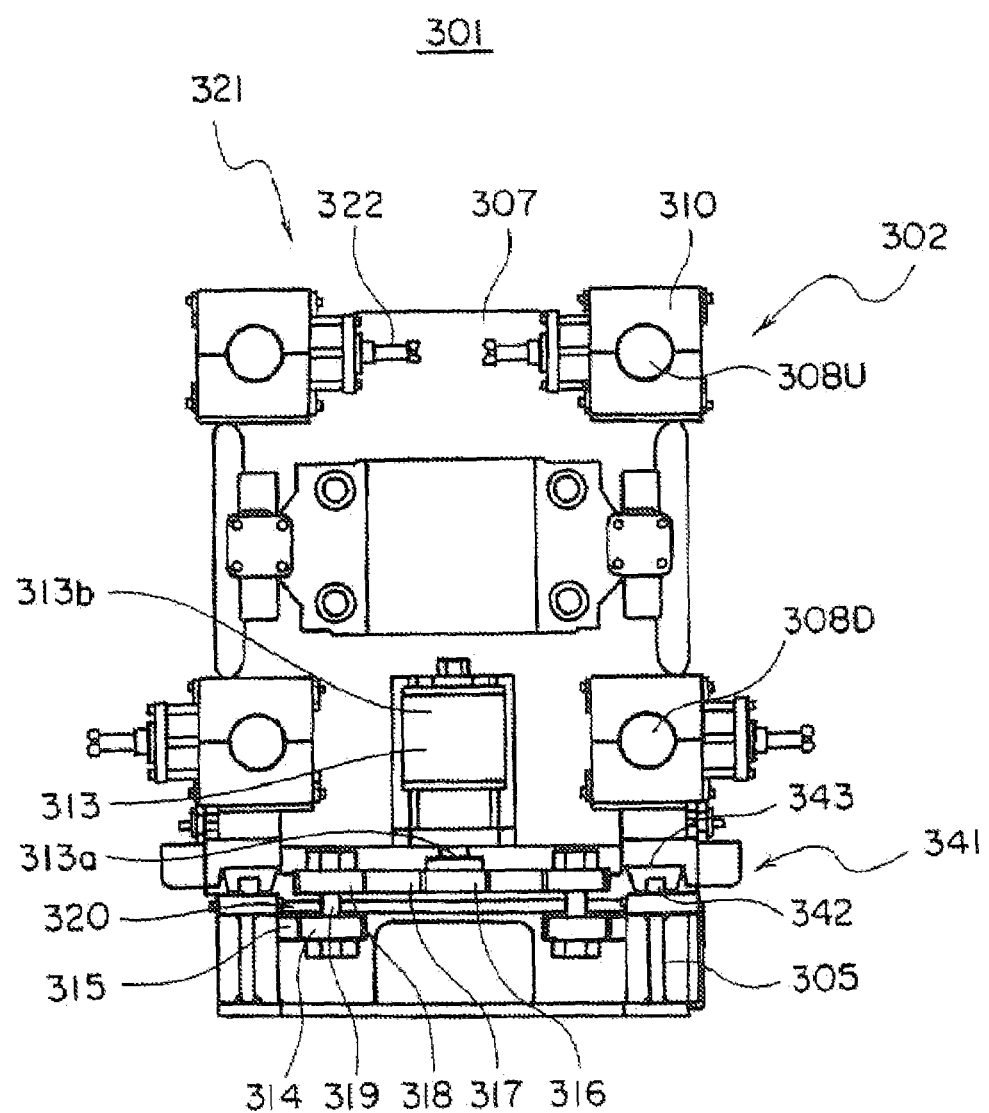
FIG. 7 is a view illustrating a molding machine seen from the movable die plate side, according to a fourth embodiment of the present invention.

FIG. 7 is a view of a die cast machine 301 seen from a movable die plate side, according to the forth embodiment of the present invention. Note that the die cast machine 301 of the fourth embodiment, in the same way as the die cast machine 1 of the first embodiment, is provided with the injection apparatus 3 and the control unit 4, which are omitted in FIG. 7.

The clamping apparatus 302 of the die cast machine 301 is provided with a base frame 305, a fixed die plate (not shown), a movable die plate 307, tie bars 308 set to the fixed die plate and the movable die plate 307, drive apparatuses 309 for moving the movable die plate 307 in the die opening and closing direction, joint portions 310 for jointing the movable die plate 307 and the tie bars 308, and clamping cylinders (not shown) for generating the clamping force in the same way as the clamping apparatus 2 of the first embodiment. Furthermore, the clamping apparatus 302 is provided with slide units 341 for guiding the movable die plate 307 in the die opening and closing direction in the same way as the clamping apparatus 202 of the third embodiment.

The drive apparatuses 309 are provided with motors 313, pinions 314 rotated by the driving force of the motors 313, and racks 315 meshing with the pinions 314.

The motors 313 are mounted on the movable die plate 307 in an approximately middle portion of the two slide units 341 in the horizontal direction in the drawing. Output axes 313a of motors 313 extend in a downward (base frame 305) side. Motor bodies 313b of the motors 313 are mounted at the approximately same height as the lower tie bars 308D. The output axes 313a of the motors 313 are mounted at the approximately same height as the slide units 341. Note that, although a single motor 313 is illustrated in FIG. 7, another motor 313 is also mounted on a backward side in the drawings.

Two pinions 314 are provided so as to adjoin two slide units 341. The pinions 314 are rotatable about rotation axes 319 parallel to the output axes 313a of the motors 313. Note that, the pinions 314 are fixed to the rotation axes 319 and rotate together with the rotation axes 319. The rotation axes 319 are pivotally supported by a bearing plate 320 fixed to the movable die plate 307.

The transmission of the driving force from the motors 313 to the pinions 314 for example, is performed by pulleys 316 provided at the output axes 313a. The pulleys 316 rotate together with the output axes 313a, timing belts 317 set to the pulleys 316, pulleys 318 to which the timing belts 317 are set. Rotations of the pulleys 316 are transmitted, by the timing belts 317, and through rotation axes 319 which are fixed and inserted into rotation centers of the pulleys 318, to the pulleys 318.

Note that, in the motor 313 illustrated in the drawing and in another motor 313 (not shown) provided in the backward direction of the motor 313 in the drawing, the driving force to the pinion on a left side is transmitted by one motor and the other motor transmits the driving force to the pinion on a right side in the drawing. Rotation directions of the output axes 313a of two motors 313 are respectively in reversed directions.

Two racks 315 are provided so as to adjoin the two slide units 341 to each other and to fix the two slide units 341 to the base frame 305. Specifically, the racks 315 are provided inside the slide units 341 (movable die plate center side) and somewhat lower than the same. Cog surfaces of the racks 315 are formed toward the movable die plate 307 center side.

According to the above fourth embodiment, the same effect as the first embodiment can be obtained. The motors 313 provided in the middle portion of the movable die plate 307 allows the two slide units 341 to impart weight of the movable die plate 307 approximately equally. Furthermore, the racks 315 and pinions 314 provided in each slide unit allows the movable die plate 317 to impart the driving force equally in the horizontal direction in the drawing. Therefore, a loose due to a misfit between the rail 342 and the slide plate 343 of the slide unit 341 can be prevented. As a result, the movable die plate 307 can be moved smoothly.

Note that, a single motor may be provided in a middle portion of two slide units 341 to drive two pinions. In which case, for example a cog line for converting a rotation direction transmitted to the one pinion to the reversed direction may be provided.

Fifth Embodiment

FIGS. 8A and 8B illustrate a die cast machine 401 according to the fifth embodiment of the present invention. FIG. 8A is a view of the machine 401 seen from the movable die plate side and FIG. 8B is a side view of the same with broken away part. Note that, the die cast machine 401 of the fifth embodiment, in the same way as the die cast machine 1 of the first embodiment, is provided with the injection apparatus 3 and the control unit 4, which are omitted in FIGS. 8A and 8B. FIG. 8B illustrates a state where the movable die plate 407 is further moved toward the die opening direction A1 past a position of the movable die plate 407 at the start of the molding cycle.

A clamping apparatus 402 of the die cast machine 401 is provided with a base frame 405, a fixed die plate 406, a movable die plate 407, tie bars 408 set to the fixed die plate 406 and the movable die plate 407, a drive apparatus 409 moving the movable die plate 407 in the die opening and closing direction, joint portions 410 for jointing the movable die plate 407 and the tie bars 408, and clamping cylinders 411 for generating the clamping force in the same way as the clamping apparatus 2 of the first embodiment. Furthermore, the clamping apparatus 402 is provided with slide units 441 for guiding the movable die plate 407 in the die opening and closing direction in the same way as the clamping apparatus 202 of the third embodiment.

Upper tie bars 408U are the same as lower tie bars 408D in length and configuration. The tie bars 408 are provided with jointed portions 408 portioning the portions 410 in the middle thereof. Specifically, the jointed portions 408a are provided in an approximately middle portion of the tie bars 408. The tie bars 408 are locked at their end portion on the fixed die plate 406 side by the fixed die plate 406. Note that the tie bars 408 may be configured so as to be capable of pulling out similar to the upper tie bars 8U' of the second embodiment.

The drive apparatus 409 is provided with a motor 413, a pinion 414 rotating by the driving force of the motor 413, and a rack 415 meshing with the pinion 414.

The motor 413 is provided in the movable die plate 407, near one of the slide units 441. An output axis 413a of the motor 413 extends downward toward the base frame 405 side. A vertical position of the motor 413 is the same as in the fourth embodiment. The motor 413 is provided in the movable die plate 407 at an opposite side of a surface facing the fixed die plate 406 (left side of the drawing in FIG. 8B).

The pinion 414 and the rack 415 are provided on an opposite side of the motor 413 between the slide units 441. Note that attachment positions of the pinion 414 and the rack 415 and a transmission method of the driving force from the motor 413 to the pinion 414 are the same as the pinion 314 and the rack 315 provided in one side in the fourth embodiment.

According to the fifth embodiment, the same effect as the first embodiment can be obtained. Further, the rack 414 and the pinion 415 are provided near one side with respect to the die opening and closing direction and the motor 413 is provided near another side. As a result, an attachment space for parts can be easily secured in a middle portion of the movable die plate 407, for example.

Furthermore, the jointed portions 408a are provided in the middle section of the tie bars 408, so the movable die plate 407 can be moved further toward the die opening direction A1 past the position of the die plate 407 at the start of the molding cycle. As a result, when a work for attaching the die is performed, by moving the movable die plate 407 can be moved toward the die opening direction A1 past the position at the start of the molding cycle and, the working space can be secured.

The present invention is not limited to the above embodiments and it may be modified in various ways.

The molding machine may solidify a molding material in a cavity of a die and is not limited to the die cast machine. For example, it may be an injection molding machine for molding resin or plastic, or a machine for molding a material mixed with a thermoplastic material and wood flour.

The number of tie bars may be determined properly. For example a single tie bar may be provided. Note that, for uniformity of pressure in divided surfaces of the die, four die bars are suitably provided. Also, the number of locks, pinions, and driving sources may be determined properly.

The rack and the pinion may be used suitably, for example, by using a helical, a double helical, a warm, a rack, and a pinion. As a result, a more smooth start, high speed drive, and stop may be realized.

It should be understood by those skilled in the art that various modifications, combinations, sub-combinations and alterations may be implemented depending on design requirements and other factors in so far as they are within scope of the appended claims or the equivalents thereof.

What is claimed is:

1. A clamping apparatus comprising:
   a base;
   a fixed die plate fixed on the base, the fixed die plate being configured to hold a fixed die;
   a movable die plate provided movably in a die opening and closing direction on the base, the movable die plate being configured to hold a movable die;
   a rack fixed with respect to the base and extending in the die opening and closing direction;
   a pinion pivotally supported by the movable die plate and meshing with the rack;
   a driving source provided on the movable die plate, the driving source being configured to drive and rotate the pinion to move the movable die plate in the die opening and closing direction;
   a plurality of tie bars extending in the die opening and closing direction so as to pass through the movable die plate and the fixed die plate, the plurality of tie bars having a plurality of joint portions;
   a plurality of joint portions provided on the movable die plate, the plurality of joint portions being configured to engage and disengage the plurality of jointed portions of the plurality of tie bars;
   a plurality of clamping cylinders provided on the fixed die plate, the plurality of clamping cylinders having a plurality of pistons configured to lock the plurality of tie bars, and a plurality of cylinder chambers housing the plurality of pistons, the plurality of clamping cylinders being configured to generate a clamping force by a pressure oil being fed to the plurality of cylinder chambers in a state where the plurality of joint portions and the plurality of jointed portions are jointed; and
   a control unit configured to control the driving source;
   wherein,
      the plurality of tie bars include a lower tie bar provided in a base side of the fixed die plate and the movable die plate and an upper tie bar provided in an opposite side to the base side of the fixed die plate and the movable die plate, the lower tie bar has an extending portion extending from the jointed portion to an opposite side to a piston of the plurality of clamping cylinders and the lower tie bar is longer than the upper tie bar,
      the rack is provided on the extending portion so as to move the movable die plate toward a die opening direction past the jointed portion of the lower tie bar, a locked portion is provided at an end portion of the upper tie bar on the fixed die plate side, a lock portion configured to engage and disengage the locked portion and locked by the piston is provided on the fixed die plate, and the control unit controls the driving source so that the movable die plate moves toward the die opening direction past the jointed portion of the lower tie bar and the upper tie bar is pulled out from the fixed die plate, when the jointed portion of the upper tie bar and the joint portion of the movable die plate are jointed and an engagement between the locked portion and the lock portion of the fixed die plate is released.

2. A clamping apparatus as set forth in claim 1, wherein the rack is provided on a surface of the lower tie bar on the base side.

3. A clamping apparatus as set forth in claim 1, wherein the extending portion is fixed with respect to the base.

4. A molding machine comprising:

a base;

a fixed die plate fixed on the base, the fixed die plate being configured to hold a fixed die;

a movable die plate provided movably in a die opening and closing direction on the base, the movable die plate being configured to hold a movable die;

a rack fixed with respect to the base and extending in the die opening and closing direction;

a pinion pivotally supported by the movable die plate and meshing with the rack;

a driving source provided on the movable die plate, the driving source being configured to drive and rotate the pinion to move the movable die plate in the die opening and closing direction;

a plurality of tie bars extending in the die opening and closing direction so as to pass through the movable die plate and the fixed die plate, the plurality of tie bars having a plurality of jointed portions;

a plurality of joint portions provided on the movable die plate, the plurality of joint portions being configured to engage and disengage the plurality of jointed portions of the plurality of tie bars;

a plurality of clamping cylinders provided on the fixed die plate, the plurality of clamping cylinders having a plurality of pistons configured to lock the plurality of tie bars, and a plurality of cylinder chambers housing the plurality of pistons, the plurality of clamping cylinders being configured to generate a clamping force by a pressure oil being fed to the plurality of cylinder chambers in a state where the plurality of joint portions and the plurality jointed portions are jointed;

an injection sleeve communicating with a cavity defined by the fixed die and the movable die;

a plunger slidingly movable in the injection sleeve to inject a molten material into the cavity;

an injection cylinder driving the plunger; and a control unit controlling the driving source;

wherein, the plurality of tie bars include a lower tie bar provided in a base side of the fixed die plate and the movable die plate and an upper tie bar provided in an opposite side to the base side of the fixed die plate and the movable die plate, the lower tie bar has an extending portion extending from the jointed portion to an opposite side to a piston of the plurality of clamping cylinders and the lower tie bar is longer than the upper tie bar, the rack is provided on the extending portion so as to move the movable die plate toward a die opening direction past the jointed portion of the lower tie bar, a locked portion is provided at an end portion of the upper tie bar on the fixed die plate side, a lock portion configured to engage and disengage the locked portion and locked by the piston is provided on the fixed die plate, and the control unit controls the driving source so that the movable die plate moves toward the die opening direction past the jointed portion of the lower tie bar and the upper tie bar is pulled out from the fixed die plate, when the jointed portion of the upper tie bar and the joint portion of the movable die plate are jointed and an engagement between the locked portion and the lock portion of the fixed die plate is released.

* * * * *